United States Patent [19]

Chernega et al.

[11] Patent Number: 4,889,895

[45] Date of Patent: Dec. 26, 1989

[54] ELECTRON BEAM CURABLE COPOLYMER USEFUL IN RECORDING MEDIA

[75] Inventors: John G. Chernega, Stillwater; John A. Martens, North Oaks; Roger A. Olsen, Woodbury; Auburn B. Cottingham, deceased, late of Elmo, all of Minn., by Sue E. Cottingham, administrator

[73] Assignee: Minnesota Mining and Manufacturing Company, St. Paul, Minn.

[21] Appl. No.: 229,278

[22] Filed: Aug. 8, 1988

Related U.S. Application Data

[62] Division of Ser. No. 868,134, May 28, 1986, Pat. No. 4,783,370.

[51] Int. Cl.$^4$ ............................................. C07C 125/04
[52] U.S. Cl. ..................................... 525/278; 526/301
[58] Field of Search ......................... 525/278; 428/500

[56] References Cited

U.S. PATENT DOCUMENTS

| | | | |
|---|---|---|---|
| 4,163,823 | 8/1979 | Legras et al. | 428/304 |
| 4,415,630 | 11/1983 | Kubota | 428/900 |
| 4,435,485 | 3/1984 | Nakajima et al. | 428/694 |
| 4,451,535 | 5/1984 | Pinguad et al. | 428/329 |
| 4,482,610 | 11/1984 | Okita et al. | 428/483 |
| 4,526,837 | 7/1985 | Ohtsuki et al. | 428/425 |
| 4,560,616 | 12/1985 | Okita et al. | 428/423 |

FOREIGN PATENT DOCUMENTS

| | | |
|---|---|---|
| 2100037 | 8/1972 | Fed. Rep. of Germany . |
| 5077433 | of 0000 | Japan . |
| 7212423 | of 0000 | Japan . |
| 60-70515 | of 1985 | Japan . |
| 60-0514 | 4/1985 | Japan . |

OTHER PUBLICATIONS

Martens, J. A. et al., "Properties of Electron Beam Cured Magetic Coatings", presented at Radcure '84 in Atlanta, Ga., Sep. 1984.

Rand, Jr., W. N., "Electron Curing of Magnetic Coating", Radiation Curing, Feb. 1983, p. 26.

Barlow, J. W., and Paul, D. R., "Polymer Blends and Alloys-A Review of Selected Considerations", Polymer Engineering and Science, Oct. 1981, p. 985.

Primary Examiner—Joseph L. Schofer
Assistant Examiner—T. McDonald, Jr.
Attorney, Agent, or Firm—Donald M. Sell; Walter N. Kirn; Douglas B. Little

[57] ABSTRACT

Magnetic recording media have been made with a new class of binder resins having the formula

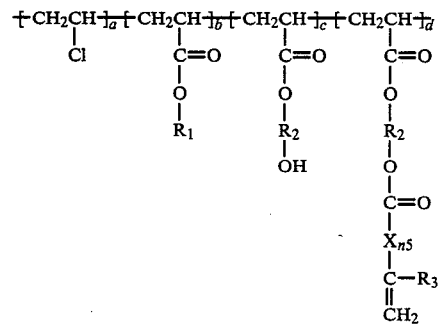

wherein
the portion of the copolymer having the a subscript comprises 50 to 97 weight percent of the copolymer,
the portion of the copolymer having the b subscript comprises 0 to 30 weight percent of the copolymer,
the portions of the copolymer having the c and d subscripts combined comprise, 0.1 to 20 weight percent of the copolymer, while d can be 0,
$R_1$ is an alkyl group selected from $-CH_3$ and $-(CH_2)_{n1}CH_3$ wherein $n1=1-10$,
$R_2$ is an alkylene group which may be $-(CH_2)_{n1}-$ or $-(CH_2)_{n2}-(CH)(CH_2)_{n3}CH_3$, $n2=1-4$ and $n3=0-4$,
$R_3$ may be selected from $-H$ and $-CH_3$, $n5=0$ or 1, and X is a linking group which is stable under electron beam irradiation and may be, for example,

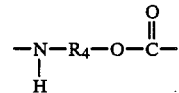

$R_4=C1-6$ alkylene, for example, with the proviso that when $d=0$, there is at least one additional polymer in the binder.

The above resins in which d is greater than 0 are electron beam curable, and recording media can be produced by using such binder resins and curing them by electron beam irradiation.

9 Claims, No Drawings

ELECTRON BEAM CURABLE COPOLYMER USEFUL IN RECORDING MEDIA

This is a division of application Ser. No. 868,134 filed May 28, 1986 now U.S. Pat. No. 4,783,370.

TECHNICAL FIELD

The invention described herein relates to magnetic recording media such as video tapes or data recording tapes or disks. In one aspect, it relates to a new family of polymeric materials which are curable by electron beam radiation. Another aspect of the invention relates to magnetic recording media having a magnetic layer cured by electron beam radiation.

BACKGROUND

The term "magnetizable material" as used in the following description refers to the component of the total magnetic recording medium (tape or disk) which is the carrier of magnetic signals, i.e., the iron oxide, barium ferrite, chromium oxide or fine metal particles in a pigment-binder system. The term "magnetizable layer" refers to the layer of a recording medium which contains the magnetizable material (e.g., pigment-binder layer). The terms "magnetic recording medium" and "recording medium" are defined as the article (e.g., tape or disk) which comprises the magnetizable layer on a backing or substrate.

Magnetic recording media are conventionally made by first making a pigment dispersion by milling the ingredients of the magnetizable layer, (e.g., polyurethane binder, gamma ferric oxide pigment, wetting agents, solvents, curing agent and lubricant) for sufficient time to obtain a uniform dispersion in an apparatus such as a ball mill or attrition mill. The dispersion is then applied in a coating process, such as gravure or knife-coating, to a flexible backing or substrate, (e.g., polyester film). After coating, the coated substrate undergoes orientation in a magnetic field to align the pigment particles (or, in the case of diskettes, randomization) after which the recording medium is dried in an oven.

Those skilled in the recording medium art are constantly searching for improved binder ingredients and formulations which yield improved electromagnetic output (signal-to-noise ratio SNR) or durability, and which also yield process improvements, such as shorter milling times or higher pigment concentration in the dispersion (resulting in less solvent use).

Electron beam curing of binder polymers for recording media magnetizable layers represents a major potential advance in the state of the art of manufacturing technology for the industry. Binder materials useful for electron beam cured magnetic coatings are designed to cure via a free-radical mechanism when exposed to ionizing radiation.

As used in this description, the term "cured" means polymerized or cross-linked into a set, stiff, or insoluble condition, and the term "curing" means cross-linking or further increasing polymer molecular weight to achieve a cured state.

DISCLOSURE OF INVENTION

This invention provides a magnetic recording medium comprising ferromagnetic particles dispersed in a binder, wherein said binder comprises a vinyl chloride-alkyl acrylate copolymer having the formula

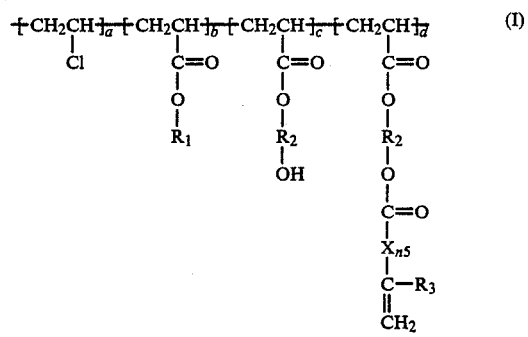

wherein
the portion of the copolymer having the a subscript comprises 50 to 97 weight percent of the copolymer, the portion of the copolymer having the b subscript comprises 0 to 30 weight percent of the copolymer, the portions of the copolymer having the c and d subscripts combined comprise 0.1 to 20 weight percent of the copolymer, while d can be 0, $R_1$ is an alkyl group selected from —$CH_3$ and —$(CH_2)_{\overline{n1}}CH_3$ wherein $n1 = 1$–$10$, $R_2$ is an alkylene group selected from the group consisting of —$(CH_2)_{\overline{n1}}$— and —$(CH_2)_{\overline{n2}}(CH)(CH_2)_{\overline{n3}}CH_3$ wherein $n2 = 1$–$4$ and $n3 = 0$–$4$, $R_3$ is —H or an alkyl group selected from the group consisting of —$CH_3$ and —$(CH_2)_{\overline{n4}}CH_3$ wherein $n4 = 0$–$4$, $n5 = 0$ or 1, and X is a linking group which is stable under electron beam irradiation and is selected from the group consisting of

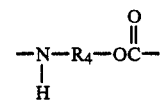

wherein $R_4$ may be an alkylene moiety having 1–12, preferably 1–6, carbon atoms or a cycloalkylene moiety having 5–8 carbon atoms;

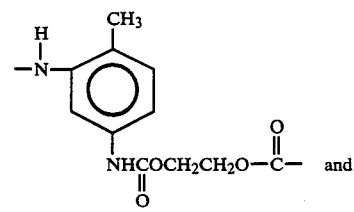

and

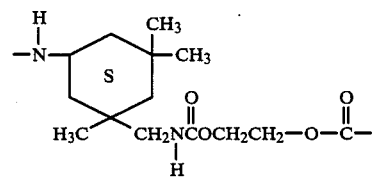

with the proviso that when $d = 0$, there is at least one additional polymer in the binder.

For the recording media described herein in which the subscript d of the above formula is greater than 0, the binder copolymer can be cured by means of electron beam radiation. Those copolymers of the above formula in which d is greater than 0 are themselves novel and considered a part of the present invention. These copolymers were created by converting some of the hydroxyl groups of a known hydroxylated copolymer into active ethylenically unsaturated groups. These copolymers have been found to provide: good adhesion of the binder to polyester substrate film; good wetting and dispersing of the magnetic pigment; relatively high modulus of elasticity; very low stiction as measured by start-up torque; media of good durability; and low blocking.

The use of binder copolymers in which d is 0 in place of conventional vinyl polymers has produced magnetic media which meet or exceed specified requirements while providing improved electromagnetic output (SNR). In addition, the pigment-binder dispersions made with these copolymers exhibit a lower viscosity at a higher solids concentration than standard dispersions, resulting in the following potential advantages: shorter milling time and greater magnetic pigment concentration or less solvent use in the dispersion.

DETAILED DESCRIPTION

Raw materials which have been found useful in synthesizing the electron beam curable vinyl chloride-alkyl acrylate copolymers of this invention are copolymers of vinyl chloride and acrylic esters containing reactive hydroxyl groups at the acrylate sites. Suitable copolymers would have the formula

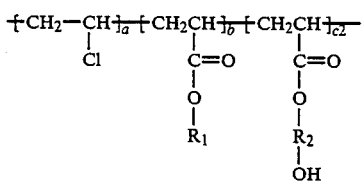

II wherein the portion of the copolymer having the c2 subscript comprises 0.1–20 weight percent of the copolymer molecule.

Such raw materials are obtainable under the trademark Vinnol from Wacker-Chemie BmbH of Munich, West Germany. Useful embodiments of these raw materials typically have about 75 to 85% vinyl chloride content, 5 to 20% acrylic ester content, about 1.6 to 3% hydroxyl group content (as —OH), and are supplied as a white powder. Their weight average molecular weight ($M_w$) is typically about 80,000 to 93,000, and their number average molecular weight ($M_n$) is typically about 21,000 to 33,000.

The hydroxyl groups of these copolymers may be converted into active ethylenically unsaturated groups by reacting them with a functionalizing reagent which is a difunctional molecule having: a vinyl or other unsaturated radiation curable moiety at one end, a group reactive with alcohols at the other end and typically a molecular weight of less than 1000. Some useful functionalizing reagents are:

(1) isocyanates of the formula

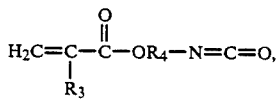

such as isocyanatoethyl methacrylate (IEM) in which $R_3 = -CH_3$ and $R_4 = -(CH_2)_2$.

(2)

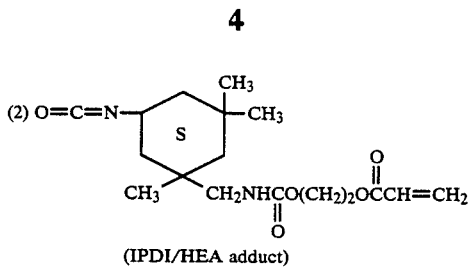

(IPDI/HEA adduct)

which may be prepared by reacting isophorone diisocyanate (IPDI) with 2-hydroxyethyl acrylate (HEA)

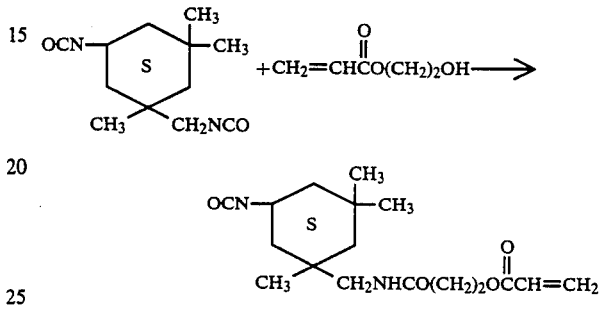

as follows: 111 grams (g.) of IPDI was charged to a 250 ml 3-neck round bottom flask equipped with a stirrer, thermometer, dry air inlet and water cooling bath. Under a dry air purge 45 g. toluene, 0.92 g stannous octoate, and 0.05 g. propyl gallate were added and dissolved with agitation. Next, 72.5 g of 2-hydroxyethyl acrylate was added slowly over a 45 minute period with cooling water applied to maintain temperatures below 30° C. Stirring was maintained for 4 days at which point a stable —NCO equivalent weight was attained. The product was stored in a brown bottle for further use.

(3) 2,4-toluene diisocyanate/HEA adduct

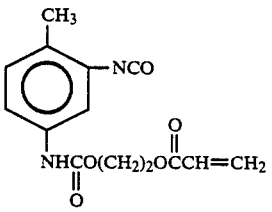

which may be prepared in a manner similar to that described above, substituting 2,4-toluenediisocyanate for IPDI in equimolar ratios.

(4) acryloyl chloride

The extent of acrylation or methacrylation can be controlled by the stoichiometric ratio of IEM (or other functionalizing reagent) to the moles of functional polymer hydroxyl groups present in the acrylated copolymer raw material. About 20 to 70% acrylation (i.e. acrylating 20 to 70% of the available hydroxyl groups) is preferred.

The functionalizing reaction can be carried out in a four-neck two-liter flask, fitted with a condenser, an agitator, temperature control, an inlet and outlet for dry nitrogen gas. A weighed amount of vinyl chloride-alkyl acrylate copolymer (in accordance with formula II) is dissolved in a suitable solvent from which virtually all water has been removed. Suitable solvents are tetrahydrofuran, ethyl acetate, methyl ethyl ketone (MEK) cyclohexanone and methyl isobutylketone (MIBK).

The polymer solution is distilled azeotropically to remove any residual water. Free radical inhibitors such as phenothiazine or p-methoxy phenol are added to the extent of about 50 to 1000 parts per million (ppm) concentration to prevent the acrylate double bond from polymerizing prematurely. A catalyst such as dibutyl tin dilaurate, stannous octoate, or triethyl amine is added to accelerate the reaction between the vinyl chloride-alkyl acrylate copolymer and the functionalizing reagent. The reaction mixture is heated to 60°-80° C. in a nitrogen atmosphere for 1 to 6 hours. Completion of the reaction or the extent to which the hydroxyl groups have been functionalized may be judged by infrared spectroscopic measurement.

The invention will be further clarified by considering the examples which will follow this description. They are intended to be purely exemplary.

EXAMPLE I 150 g of a terpolymer of vinyl chloride, hydroxypropyl acrylate and butyl acrylate (obtained as Vinnol E22/48A from Wacker-Chemie) was added to 450 g of dry MEK in a 4-neck flask. This mixture was mechanically stirred while being heated to 70° C. to dissolve all of the terpolymer. 15% of the solvent was removed by azeotropic distillation at 80° C. to further dehydrate the solution. The temperature was then lowered to 70° C., and the following reagents were added sequentially: 0.15 g phenothiazine, 0.11 g dibutyl tin dilaurate, and 9.0 g IEM. The resulting reaction was maintained at 70° C. under dry nitrogen atmosphere for 2 hours after which the reaction was complete, producing a homogeneous solution of an acrylated resin in accordance with formula I wherein moiety X was

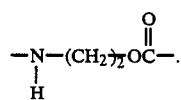

About 30% of the hydroxyl groups were acrylated in this procedure.

The weight ratio of the vinyl chloride-alkyl acrylate copolymer raw material (e.g. Vinnol E22/48A from Wacker-Chemie) to IEM typically ranges between about 4 and 20.

The procedure of Example I will yield an electron beam curable vinyl chloride-alkyl acrylate copolymer having the following formula

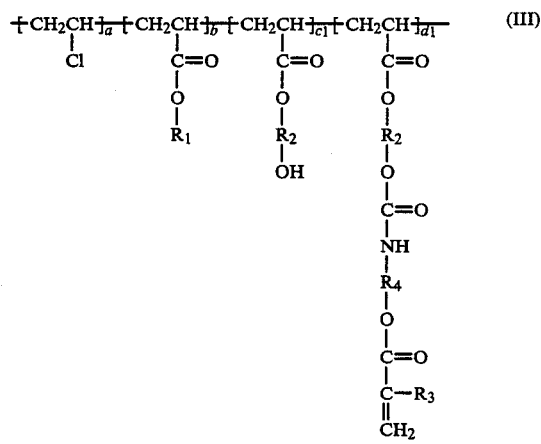

wherein the portion of the copolymer having the $c_1$ subscript comprises 0.1–7 weight percent of the copolymer and the weight ratio of the portion of the copolymer having the $d_1$ subscript to the portion having the $c_1$ subscript is 0.2–4.0.

In a preferred embodiment, $R_1$ is $-(CH_2)_3CH_3$, $R_2$ is

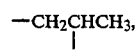

$R_4$ is $-(CH_2)_2$, $a = 100-1000$ molecular units; $b = 10-100$; $c_1 = 20-300$; and $d_1 = 1-100$. The portion of the molecule with the subscript d or $d_1$ has the functionalized acrylic segment which provides the radiation sensitive moiety enabling crosslinking by electron beam radiation. $M_w$ of such copolymers has been measured in the range of 87,000–100,000 and $M_n$ has been measured in the range of 21,000–36,000.

EXAMPLE II 345 g. of the terpolymer used in Example I was added to 993 g. of MEK solvent in a 2 liter (3) necked round bottom flask equipped with stirrer, nitrogen inlet tube, thermometer, reflux condenser, and heating mantle. After polymer dissolution, 101.0 g. of IPDI/HEA adduct described above was added to the flask, along with 1.6 g. of dibutyl tin dilaurate catalyst. The mixture was heated to 79°-80° C. for 16 hours until the —NCO functionality was totally reacted as determined by infrared spectroscopy. This product, a resin of formula I in which $d > 0$ and X was

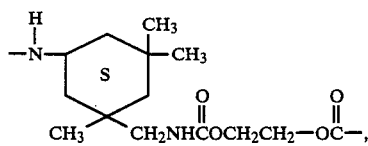

was removed from the flask and stored for future use in making magnetic media.

RECORDING MEDIA

The inventive magnetic recording media can be made by a process which begins with the conventional steps described in the Background section above. Examples of magnetic oxide pigment powders which can be dispersed within the pigment compositions are: $\gamma Fe_2O_3$, cobalt adsorbed ferric oxide ($\gamma Fe_2O_3$), $Fe_3O_4$, cobalt adsorbed $Fe_3O_4$, fine metal particles (Fe), barium ferrite (BaFe), and $CrO_2$. Nonmagnetic oxides, such as a $\alpha Fe_2O_3$, $Cr_2O_3$, silica, alumina, and titanium dioxide, lubricants and carbon black may also be dispersed within the pigment-binder dispersion. Volatile organic solvents which may be used to make the dispersion include: MEK; MIBK; methyl, ethyl and butyl acetates; tetrahydrofuran; dioxane; heptane; toluene; xylene; dichloromethane and cyclohexanone.

The generalized procedure for making the pigment-binder dispersion comprises the following steps:

1. Mix together wetting agent, solvent, magnetic pigment and binder resin in a blade mixer ("Shar" mixer) until homogeneous.

2. Mill the mixture from Step 1 in a sand mill taking samples every 2 hours until the desired dispersion smoothness (no visible particle aggregates or agglomerates) has been achieved.

The dispersion is coated onto biaxially oriented polyester film. Typically the concentration of magnetizable pigment in the dispersion is between 60 and 80% by weight of the nonvolatile materials (i.e. materials which remain in the final dried magnetizable layer). A typical thickness for the polyester film substrate of a recording medium is 10–15 micrometers, and a typical dry film thickness for the magnetizable layer is 1–5 micrometers. The dried magnetizable layer may be calendered under pressure.

ELECTRON BEAM CURED RECORDING MEDIA

After the drying and possible calendering steps, the recording medium is irradiated with an electron beam (e-beam) under inert atmosphere (nitrogen, less than 300 ppm $O_2$) at a dosage of between 0.5 and 20 megrads (Mrads), preferably 2–15 Mrads. The proper accelerating voltage is dependent upon the thickness of the magnetizable layer. The electron beam may have an accelerating voltage of from 100 to 1000 KeV, preferably 150–300 KeV. The higher voltages (e.g. 200 KeV or greater) may be required for thicker (greater than 6 micrometers) magnetizable layers. A suitable electron beam apparatus is the Electrocurtain apparatus made by Energy Sciences of Woburn, Massachusetts. The temperature at which the recording medium enters the e-beam apparatus is normally room temperature.

The electron beam irradiation causes a free radical curing reaction centered at the site of ethylenic unsaturation in the copolymers of formula I wherein subscript d is greater than 0. E-beam curing has several advantages. E-beam curable coating formulations require no added isocyanate activator. This is a major improvement over handling such systems as the two-component isocyanate system with its relatively short pot life and inherent safety problems associated with highly reactive isocyanates. Higher solids concentration in the coating formulations means that less solvent is required, and higher speed drying or a reduced energy usage in the drying operation is possible.

E-beam curing should occur after calendering; whereas, in the conventional isocyanate curing process curing begins before calendering. In calendering an uncured coating one is treating a thermoplastic material rather than a thermoset material which resists flow more. This exposes the calender rolls to a far softer material, substantially reducing wear on the calender pressure rolls. Replacement of worn rolls is an expensive process and can contribute substantial cost because of the wear caused by extreme pressures required to compress and flatten hard, semi-cured coatings.

In addition, e-beam cure is virtually instantaneous and relatively independent of small amounts of water present in the binder system. Cure levels, with e-beam curing, can approach 100% at dosages less than 10 Mrads, and the recording media exhibit very good durability, runability, low frictional properties, and good environmental stability.

After curing the magnetic media, which is generally in the form of a continuous web, may be slit into strips of magnetic recording tape or cut into disk form for use in diskettes (i.e. floppy disks or micro-floppy disks).

A useful dispersion formulation for diskettes comprises:

|  | parts by weight |
| --- | --- |
| MIBK | 78 |
| quaternary ammonium acetate (dispersing agent as in Example III) | 2 |
| phosphonate ester (dispersing agent) | 8 |
| Cobalt doped $\gamma Fe_2O_3$ | 100 |
| Alumina powder (head cleaning agent) | 6 |
| Resin of Formula III | 36 |
| Carbon black | 6 |

The phosphonate ester dispersing agent is a triacrylate having the structure:

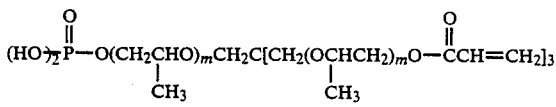

in which m=1–10, preferably 1–5. It may be prepared by the following reaction sequence:

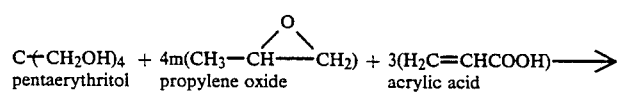

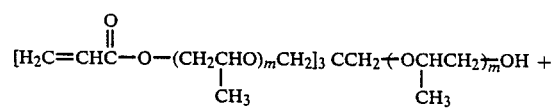

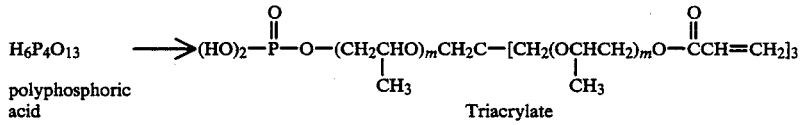

The last step of the above sequence may be carried out using, for example, the following raw materials:

propoxylated partially acrylated polyol: 7.000 Kg (obtained as Photomer 4171 from Diamond Shamrock Chemical Company)

phenolic antioxidant (obtained as Irganox: 8.1 g 1010 from Ciba-Geigy Corp.)

polyphosphoric acid: 1.785 Kg

The polyphosphoric acid (PPA) is poured into a clean, dry 12.4 liter round bottom flask containing the propoxylated partially acrylated polyol and the antioxidant over a 70 minute period during which the batch temperature is controlled at about 70°–90° C. The reaction flask is then heated to 95° C. and maintained at that temperature for 3 hours. The reaction is continued at 93° C. and maintained at that temperature for 3–4 hours with agitation.

The batch is cooled to about 80° C. and 1.5 liters of deionized water are added after which about 3 liters of toluene are added. The batch is mixed for one hour and is allowed to settle. The water phase (about 1.1 liter) is decanted from the flask. One liter of water is added to the batch for a second water wash, after which, the agitation is stopped, the batch was allowed to settle and about 1.1 liter of water is again decanted off.

Azeotropic distillation is begun, resulting in the removal of water with the batch temperature at 95°–112° C. Finally, the batch is cooled down to near room temperature.

For use in coating onto polyester substrate, the dispersion is adjusted to about 35% solids. The coating process is performed as described above using an electron beam apparatus (by RPC Industries) in which the polyester film contacts a preconditioning roll while it is irradiated at 7 Mrad. The preconditioning roll is temperature controlled normally between 25° C. and 60° C.

The polymers represented by formula I above have the advantage that they form stable miscible blends with other polymers useful in magnetic recording media binders, such as polyurethanes. Not all polymers are miscible with other polymers to form stable blends. Stable miscible polymer blends are defined as mixtures of at least 2 polymers which result in a single amorphous phase having a single glass transition temperature ($T_g$) or a single heat distortion temperature (HDT) which is uniquely determined by the blend composition. Stable miscible binder polymer blends are beneficial in the creation of exceptional magnetic media binder compositions. Stable miscible polymer blends of the polymers of Formula I with poly($\epsilon$-)caprolactone polyurethanes, which blends have a single $T_g$, are within the scope of this invention.

The e-beam curable binder of Formula I wherein subscript d is greater than 0 provides the opportunity to use multiple cure mechanisms to further enhance the final properties of the magnetic media. For example, binder systems can be both hydroxyl functional (such as VAGH partially hydrolyzed, vinyl chloride-vinyl acetate copolymer from Union Carbide Corporation) and e-beam curable. The inventive copolymers of formula III have been initially crosslinked with isocyanate during the coating operation, and, after surface treating (calendering) irradiated with an e-beam for final cure. This technique allows the formation of interpenetrating polymer networks (IPN's) which improve the physical and mechanical properties of the resultant coatings. The term IPN denotes a class of materials which contain at least two polymers, each in network form. The two polymers must have been synthesized or crosslinked in the presence of each other, and they cannot be separated physically. IPNs may be thought of as two polymer networks which have been interwoven or which have become inextricably tangled together in three dimensions.

Samples of a commercially available hydrolyzed vinyl chloride-vinyl acetate copolymer binder resin, a commercially available vinyl chloride-vinyl acrylate copolymer of Formula II, and a functionalized vinyl chloride-vinyl acrylate copolymer of Formula III were all cured and tested for various physical properties, and the results of those tests are indicated below in Table 1.

TABLE 1

| Binder Polymer | e-beam dose (M-rad) | Modulus of Elasticity (MPa) | Tensile Strength (MPa) |
| --- | --- | --- | --- |
| VAGH hydrolyzed vinyl chloride-vinyl acetate copolymer[1] | 0 | 926 | 46.3 |
| Vinyl chloride-vinyl acrylate copolymer of formula II[2] | 0 | 1,588 | 40.0 |
| Vinyl chloride-vinyl acrylate copolymer of formula III | | | |
| 14% Acrylated | 0 | 1,613 | 25.6 |
| | 10 | 2,910 | 55.7 |
| 22% Acrylated | 0 | 2,220 | 47.5 |
| | 10 | 2,703 | 58.9 |
| 29% Acrylated | 0 | 2,579 | 50.4 |
| | 10 | 3,089 | 53.1 |
| 42% Acrylated | 0 | 1,703 | 52.4 |
| | 10 | 2,689 | 54.7 |

[1] From Union Carbide Corporation
[2] Obtained as Vinnol E22/48A from Wacker-Chemie GmbH The improvement of tensile strength and modulus of elasticity with the e-beam cured resins of this invention is evident from the data above, and the modulus of elasticity is even improved for the vinyl chloride-vinyl acrylate copolymer in which subscript d equals 0 as compared to that of the conventional hydrolyzed vinyl chloride-vinyl acetate copolymer. The data also show that modulus of elasticity and tensile strength both increase as the percent acrylation increases.

To make a diskette, a liner fabric, such as non-woven rayon or polypropylene (see U.S. Pat. Nos. 3,668,658, 4,239,828 and 4,263,364 which are incorporated herein by reference) is applied and adhered to a jacket material which is then cut to provide a jacket blank. The jacket blank is folded to form the approximately square jacket or envelope and is bonded to itself at three of the four edges of the jacket. Then the recording medium disk is inserted into the jacket and the fourth edge is sealed.

There are usually several apertures in a jacket, such as a central aperture, a head access window and an indexing hole.

In making the type of diskettes known as microdiskettes or microfloppies (generally about 50 to 100 mm in nominal diameter) instead of a flexible jacket material as used in floppy diskettes (polyvinylchloride or polyester) a more rigid molded plastic shell is used to enclose the recording medium disk, also, there is usually a shutter which covers the head access hole when the microfloppy is outside of a disk drive. Microfloppys are generally made by the following process steps:

1. Top and bottom halves of the shell are molded in a plastic molding process.
2. A wiping fabric is placed in the shell halves and bonded thereto.
3. A recording medium disk with a hub in the center is installed in one half of the shell, and the other half of the shell is installed on the first half.
4. A shutter mechanism is then installed on the shell after which the shell halves may be bonded to each other.

RECORDING MEDIA CONTAINING BINDER OF FORMULA II

Although certain vinylchloride-alkylacrylate copolymers within the scope of the Formula II are known, their use as binder resins and magnetic recording media is novel. Even though they are not e-beam curable, they still lend certain advantages to normal media processing and to the media themselves. Two commercially available polymers within the scope of Formula II are VINNOL E15/48A and E20/55A resins made by Wacker-Chemie. They are copolymers of polyvinyl chloride and 2-hydroxypropyl acrylate. In a preferred embodiment of Formula II, $R_1$ is $-(CH_2)_3CH_3$ and $R_2$ is

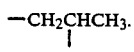

VINNOL resins are soluble in ketone solvents such as MEK and acetone, as well as in tetrahydrofuran, ethyl acetate, and alcohols.

These copolymers are incorporated into pigment binder dispersions for magnetic media by the conventional method described above. For example, a mixture can be made of solvents, such as MEK and cyclohexanone, dispersants, the copolymers of formula II, a polyester-polyurethane polymer, and acicular ferric oxide particles. This mixture would be milled in a sand mill until a uniform dispersion is obtained after which a second mixture comprising solvent, mixture of MEK and alkyl ether of ethylene glycol (such as Cellosolve solvent) and toluene diisocyanate (TDI or a TDI derivative) is combined with the first mixture. The resulting total dispersion is then ready to be coated onto biaxially oriented polyester (polyethylene terephthalate) film and processed in the normal manner. The following examples illustrate this procedure:

EXAMPLES III-IV

In making the magnetic recording media, Charges A and B listed below were used.

| | Weight (grams) |
|---|---|
| Charge A | |
| MEK | 3000 |
| Toluene | 1300 |
| Cyclohexanone | 2300 |
| Dispersing Agent (quaternary ammonium acetate furnished as Emcol Acetate from Witco Chemical Co., Inc. 80% solids in ethylene glycol) | 300 |
| Dispersing Agent (phosphorylated polyoxyalkyl polyol 75% solids in toluene) | 135 |
| Co encapsulated $Fe_3O_4$ | 5800 |
| Magnetic $CrO_2$ | 1025 |
| Resin of Formula II (Vinnol E22/48A 30% solids in MEK) | 1275 |
| Charge B | |
| Polyester-polyurethane (synthesized from poly(ε-caprolactone and diphenyl methane diisocyanate–35% resin and 65% MEK) | 2500 |
| Alumina | 135 |
| MEK | 1275 |

Charge A was mixed by an agitator until homogeneous, after which Charge B was gradually added to Charge A. After the mixture of Charges A and B was homogeneous, it was milled in a sand mill. Hand spreads of samples were removed about every hour and were checked visually for smoothness under magnification, comparing them to a standard. The milling continued two hours after the hand spreads appeared as smooth as the standard.

Example IV was prepared in a similar manner to Example III except that the resin of Formula II was replaced by a low molecular weight terpolymer of vinyl chloride, vinyl acetate and a hydroxyl-containing alkyl acrylate obtained as VROH resin from Union Carbide Corporation.

The percent solids and viscosity of the dispersions of Examples III and IV are indicated in Table 2 below.

TABLE 2

| Example | Percent solids | Viscosity (Ferranti-Shirley) @ 1600 Sec$^{-1}$ | @ 16,000 sec$^{-1}$ |
|---|---|---|---|
| III | 45% | 76 | 41 |
| IV | 43% | 151 | 78 |

Solids content of each dispersion was adjusted to 45±1%, and lubricant comprising myristic acid, lauric acid and butyl myristate (ratio of 0.3:0.5:1.5) was added at a ratio of 1.4 parts by weight per 100 parts by weight of magnetizable material ($CrO_2$ and $Fe_3O_4$). The lubricant was mixed with the dispersion for 10 minutes before the dispersion was used. In addition, a cross-linking polymer comprising a triisocyanate, at a level of 6.6 parts by weight per 100 parts by weight of magnetizable material, was mixed into the dispersion for 10 minutes before coating the dispersion.

The dispersions of Examples III and IV were gravure coated onto a biaxially oriented polyethylene terephthalate film. The polyethylene terephthalate film was processed at a rate of 73 meters per minute, and the drying oven temperature was 60°–70° C. After drying the coating, the magnetizable layer, in each case, was calendered to provide a smooth surface.

Despite the fact that the dispersion of Example III has a slightly greater solids concentration, its viscosity is roughly half that of the dispersion of Example IV, made with a conventional binder resin. If the gravure coating machine is adjusted for a viscosity of, for example, 40 centipoise (cps) or less, the dispersion of Example IV would have to be thinned with solvent. Experience indicates that lowering the solids concentration another 3 to 7% will be necessary. If this is done, the dispersion of Exmaple III, which already approximately meets the 40 cps criterion, would have a significant advantage in solids concentration. This advantage, extended over millions of square meters of coated magnetic media, represents a considerable savings in solvent costs.

The magnetic media of Examples III and IV (which were video media) were tested for various electromagnetic and magnetic characteristics, the results of which are shown in Table 3 below.

TABLE 3

|            | Rf output (dB) | SNR (dB) | Squareness Ratio | Remanence Br(gauss) |
|------------|----------------|----------|------------------|---------------------|
| Example III | 1.8           | 0.4      | 0.82             | 1334                |
| Example IV  | 1.1           | 0.1      | 0.81             | 1316                |

The video deck used for testing was an RCA VBT 20B. Testing was in the SP mode.

Radio frequency (Rf) output is measured by recording a 4 megahertz unmodulated signal on a test medium and measuring its output level in decibels (dB). Results are reported as a comparison to a reference medium. Both Rf output and SNR of the inventive recording medium of Example III are improved over that of the Example IV.

Other Examples of pigment/binder dispersion recording media were made by a similar process to that explained in Examples III and IV above, but with different proportions of ingredients. In those experiments, the time to mill the dispersions for the inventive media containing the binder resin of Formula II, was 3-4 hours; whereas, the mill time for the dispersion containing conventional binder resin was 7 hours.

The phosphorylated polyoxyalkyl polyol dispersing agent of Charge A above is exemplified by

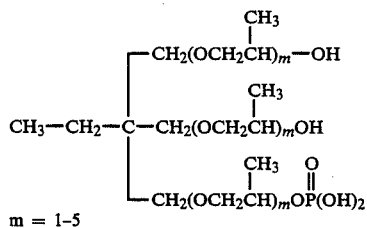

m = 1-5

Such phosphorylated polyols can be made using commercially available triols, such as TP440 or TP2540 (from BASF Wyandotte Corp.). A generalized procedure is to first purge a reaction vessel with dry nitrogen, and then add 100 parts by weight of triol and 20 parts by weight of toluene to the vessel. This solution is heated to 50° C., and 14 parts by weight polyphosphoric acid is then added. After adding 42 parts by weight of toluene, the solution is heated to 80° C., agitated for 2 hours and then cooled to 60° C. Three parts by weight of phosphorous pentoxide is added while maintaining a dry atmosphere over the solution. Temperature is increased to 80° C., and the solution is stirred for four hours during which the reaction proceeds. After cooling to 65° C., 75 parts by weight distilled water and 25 parts toluene are added. This mixture is stirred for 90 minutes, and then the organic and aqueous phases are allowed to separate for two hours. The aqueous phase is decanted and the water remaining in the organic phase is removed by vacuum distillation as the water toluene azeotrope. The phosphorylated polyoxyalkyl polyol is obtained in toluene solution.

While certain representative embodiments and details have been shown for the purpose of illustrating the invention hereinabove, it will be apparent to those skilled in the art that various changes and modifications may be made in this invention without departing from its true spirit or scope which is indicated by the following claims.

What is claimed is:

1. An electron beam curable copolymer of at least one hydroxy functional alkyl acrylate and at least one polyvinyl chloride having the formula

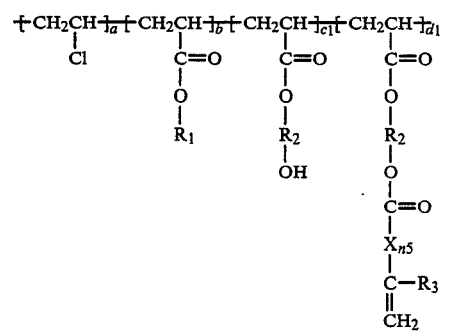

wherein
  the portion of the copolymer having the a subscript comprises 50 to 97 weight percent of the copolymer, the portion of the copolymer having the b subscript comprises 0 to 30 weight percent of the copolymer, the portion of the copolymer having the c1 subscript comprises 0.1 to 7 weight percent of the copolymer, the weight ratio of the portion of the copolymer having the d1 subscript to the portion having the c1 subscript is from 0.2 to 4.0,
  $R_1$ is an alkyl group selected from $-CH_3$ and $-(CH_2)_{\overline{n1}}CH_3$ wherein n1 = 1-10,
  $R_2$ is an alkylene group selected from $-(CH_2)_{\overline{n1}}$ and $-(CH_2)_{\overline{n2}}(CH)(CH_2)_{\overline{n3}}CH_3$ wherein n2 = 1-4 and n3 = 0-4,
  $R_3$ is selected from the group consisting of $-H$, $-CH_3$ and $-(CH_2)_{\overline{n4}}CH_3$, wherein n4 = 0-4, n5 = 0 or 1, and X is a linking group which is stable under electron beam irradiation and is selected from the group consisting of

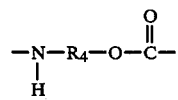

wherein $R_4$ is selected from the group consisting of alkylene moieties having 1-6 carbon atoms and cycloalkylene moieties having 5-8 carbon atoms;

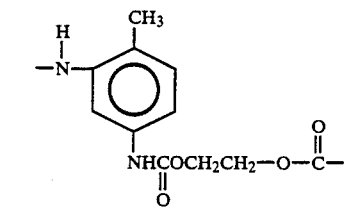

and

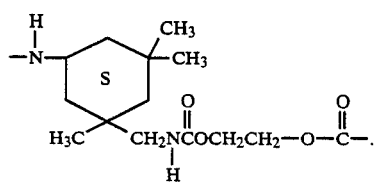

2. The copolymer of claim 1 wherein X is

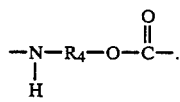

3. The copolymer of claim 2 wherein R$_4$ is —CH$_2$)$_2$.

4. A stable, miscible, polymer blend of a polyurethane and a vinylchloride-alkylacrylate copolymer having the formula

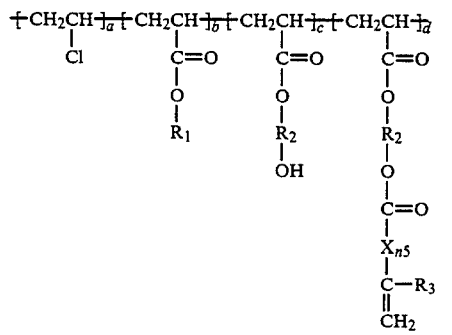

wherein the portion of the copolymer having the a subscript comprises 50 to 97 weight percent of the copolymer, the portion of the copolymer having the b subscript comprises 5 to 30 weight percent of the copolymer, the portions of the copolymer having the c and d subscripts combined comprise 0.1 to 20 weight percent of the copolymer, while d can be 0, R$_1$ is an alkyl group selected from —CH$_3$ and —(CH$_2$)$_{n1}$CH$_3$ wherein n1 = 1–10, R$_2$ is an alkylene group selected from the group consisting of —(CH$_2$)$_{n2}$— and —(CH$_2$)$_{n2}$(CH)(CH$_2$)$_{n3}$CH$_3$ where n2 = 1–4 and n3 = 0–4, R$_3$ is selected from the group consisting of —H, —CH$_3$ and —(CH$_2$)$_{n4}$CH$_3$ wherein n4 = 0–4, n5 = 0 or 1, and X is a linking group which is stable under electron beam irradiation and is selected from the group consisting of

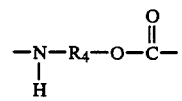

wherein R$_4$ is selected from the group consisting of alkylene moieties having 1–6 carbon atoms and cycloalkylene moieties having 5–8 carbon atoms;

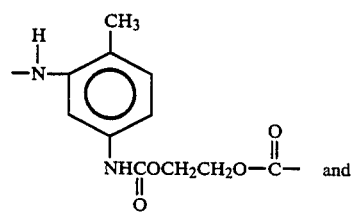

and

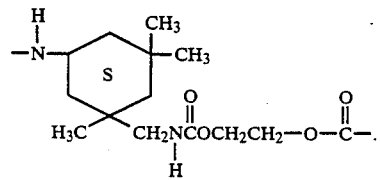

5. A process for making a vinylchloride-alkylacrylate copolymer which is curable by electron beam irradiation comprising the steps of:

A. Providing a first raw material comprising a copolymer of vinylchloride and an acrylic or methacrylic acid ester which contains reactive hydroxyl groups at the acrylate sites and which has the following formula:

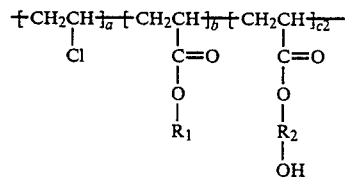

wherein

R$_1$ is an alkyl group selected from —CH$_3$ and —(CH$_2$)$_{n1}$CH$_3$ wherein n1 = 1–10, R$_2$ is an alkylene group selected from the group consisting of —(CH$_2$)$_{n1}$— and —(CH$_2$)$_{n2}$(CH)(CH$_2$)$_{n3}$CH$_3$ wherein n2 = 1–4 and n3 = 0–4, the portion of the copolymer having the a subscript comprises 50 to 97 weight percent of the copolymer, the portion of the copolymer having the b subscript comprises 0 to 30 weight percent of the copolymer; and the portion of the copolymer having the c2 subscript comprises 0.1 to 20 weight percent of the copolymer;

B. Reacting the copolymer from A with a functionalizing reagent which comprises difunctional molecules having a vinyl or other unsaturated radiation curable moiety at one end, and a group reactive with alcohols at the other end.

6. The process of claim 5 wherein the functionalizing reagent is selected from the group consisting of isocyanates of the formula

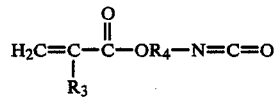

in which $R_3$ is selected from the group consisting of —H, —$CH_3$ and —$(CH_2)_{n4}CH_3$ wherein $n4=0-4$ and $R_4$ is selected from the group consisting of alkylene moieties having 1 to 6 carbon toms and cycloalkylene moieties having 5 to 6 carbon atoms, adducts of isophorone diisocyanate and 2-hydroxyethyl acrylate; adducts of toluene diisocyanate and 2-hydroxyethyl acrylate; and acryloyl chloride.

7. The process of claim 6 wherein the functionalizing reagent is isocyanatoethyl methacrylate.

8. The electron beam curable copolymer of at least one hydroxy functional alkylacrylate and at least one polyvinyl chloride as recited in claim 1 wherein the portion of the copolymer having the $b$ subscript comprises 5 to 30 weight percent of the copolymer.

9. The process as recited in claim 5 wherein the portion of the copolymer in step A having the $b$ subscript comprises 5 to 30 weight percent of the copolymer.

* * * * *